E. AUFIERO.

ALARM DEVICE.

APPLICATION FILED AUG. 6, 1917.

Reissued Oct. 23, 1917. 14,378.

Inventor:
Emanuel Aufiero
by Mauro, Cameron, Lewis & Massie
Attys

UNITED STATES PATENT OFFICE.

EMANUEL AUFIERO, OF BROOKLYN, NEW YORK.

ALARM DEVICE.

14,378. Specification of Reissued Letters Patent. Reissued Oct. 23, 1917.

Original No. 1,082,458, dated December 23, 1913, Serial No. 703,232, filed June 12, 1912. Application for reissue filed August 6, 1917. Serial No. 184,755.

*To all whom it may concern:*

Be it known that I, EMANUEL AUFIERO, a citizen of the United States of America, and a resident of Brooklyn, New York, have invented a new and useful Improvement in Alarm Devices, which invention is fully set forth in the following specification.

My invention relates to a manually-actuated signaling horn, for use on automobiles or motor-cycles and the like, in which hand or foot power is applied from a distance to mechanically agitate an acoustic diaphragm; and has for its object the embodiment of a device in which the inertia or natural frequency of the vibrating diaphragm is adapted to control the speed of an interposed spring element, or its equivalent, independently of the velocities of the impulses as imparted by the operator. This and other objects may be attained with the apparatus shown in the accompanying drawing, in which—

Figure 1:
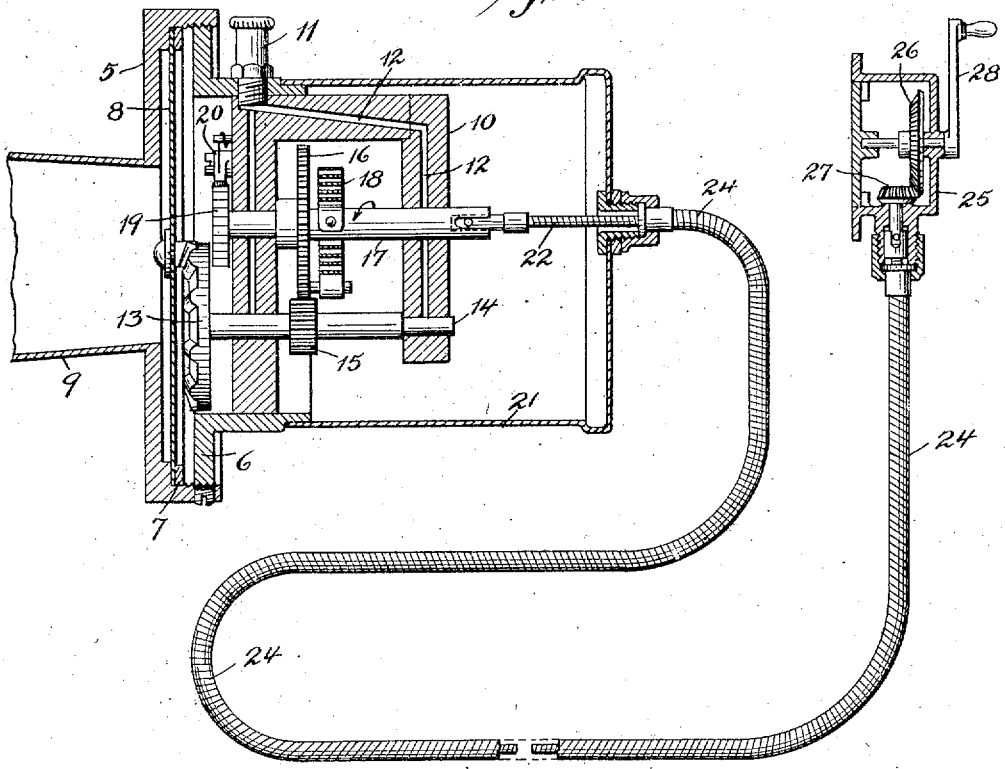
Figure 2:
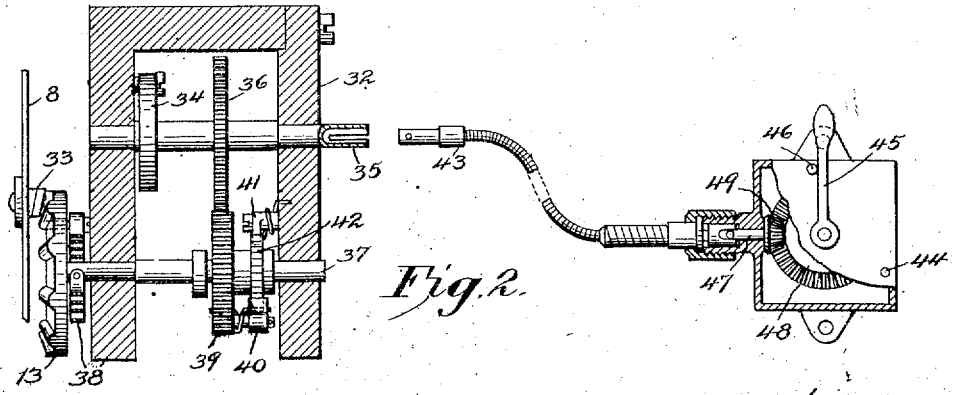

Figure 1 is a partly sectional view of one embodiment of my invention, and Fig. 2 is a modified form of power applying mechanism.

A cup-like front casing 5 is adapted to screw on the frame 6 carrying the rotary shaft 14, to which is fastened the diaphragm vibrating crown cam 13; the diaphragm 8 is secured to the front casing 5 by means of a ring 7 forced therein. It will be understood that this feature of securing the front casing to the frame 6 by means of the screw arrangement will permit variation of the distance between diaphragm and crown cam 13, whereby the amplitude of diaphragm vibrations may be easily regulated to produce the required loudness of sound, or to produce the required load condition for the motive power transmitted through a spiral spring, in order that the same may be controlled by the natural frequency of the diaphragm.

A flexible shaft 22, inclosed by casing 24 flexible or rigid, is driven by bevel gear 27, which is driven by the larger bevel gear 26 to which is fastened the crank handle 28. I find it very desirable, that the flexible shaft 22 should enter the casing 25 at an angle to the crank handle 28; so that the power of the operator may be applied vertically thereto, while the flexible shaft is liable to be connected to the alarm-device in such manner that the greater part of the shaft will rotate in a horizontal plane; said flexible shaft 22 will drive shaft 17, to which is fastened one end of a spiral spring 18, the other end thereof being pivoted to the gear 16 loosely mounted on said shaft 17.

It will be understood that rotation of shaft 17 will effect the coiling of spiral spring 18, and that the power of said shaft will be applied to rotate shaft 14 through the medium of said spring 18, gear 16, and gear 15 fastened to shaft 14. If desired a pawl 20 and ratchet 19 may be used to prevent shaft 17 from back-turning when the crank 28 is released. I find that this arrangement will produce a sharp signal of uniform pitch and practically uniform intensity not affected by any difference in velocities of the crank 28: for instance one rotation of the crank may be effected in one-fifth of a second, while the spring 18 may be adapted to rotate shaft 14 for one complete second, because the inertia and natural frequency of the diaphragm, acting through the crown cam 13, will operate as an escapement on the spring 18 regulating the velocity of same in its unwinding.

The frame 10 carrying the operating elements is secured to frame 6 by a long threaded oil-cup 11 adapted to screw into said frame 10 and to keep it in place, while the oil channels 12 therethrough will carry the oil from cup 11 to the bearings of shafts 14 and 17.

In the embodiment of my invention with the crank arrangement, as shown in Fig. 1, the power to the spring 18 may be applied by continuously turning the crank 28, or by partial turning thereof for short signals. In the modification shown in Fig. 2, I find it very desirable to provide pins 46 and 44 against which the crank 45 is made to stop; the bevel gear 48 driven thereby is preferably adapted to rotate only part of a turn, and preferably may be made a sector of a bevel gear. The smaller bevel gear 49, driven by sector 48, carries stem 47 adapted to engage the flexible shaft 43, which engages and rotates shaft 35 supported by frame 32; and a spiral spring 34, one end of which is secured to said shaft and the other end to frame 32, will return shaft 35 and crank 45 to its normal position of rest against stop pin 44. Gear 36, fastened to shaft 35, will engage gear 39 which is loosely mounted on shaft 37 carrying loosely the crown cam 13 in operative engagement with wear piece 33 secured to diaphragm 8; a ratchet gear 42 is rigidly secured to said shaft 37, and pawl 40 carried by gear 39 is adapted to engage said ratchet and to rotate shaft 37; pawl 41 is adapted to lock ratchet 42 and to prevent back turning of shaft 37.

It will be seen, that successive reciprocations of crank 45 will rotate shaft 35 and shaft 37, and will effect the coiling of a second spiral spring 38 secured to shaft 37 and cam 13 (and corresponding in function to the spiral spring 18 of Fig. 1). I find it very desirable to give short impulses to the crank 45 in the same direction preferably in a vertical direction, as this arrangement will facilitate location of the crank by the operator and will provide very efficient means for applying power thereto.

It will be noted that the force or power exerted at the handle 28 (or 45) by the muscular efforts of the operator is not applied directly upon the diaphragm-actuating member or cam 13, but is transmitted through the interposed resilient member (spring 18 or 38), whereby the irregular, jerky, non-uniform, and intermittent muscular efforts of the attendant serve to put the spring under tension up to the extent where ultimately the inertia of the entire actuating-mechanism (which includes everything from the handle up to the cam 13) has been overcome,—whereupon the cam readily overcomes the comparatively slight inertia of the diaphragm and sets the latter into vibration. It will further be noted that the interposed spring (18 or 38) not only transmits but also governs or modulates the human and consequently varying movements imparted at the handle, translating the same into the regular rhythmic and unvarying movements of the cam and diaphragm; that such interposed spring is at all times free to transmit movement to the cam and diaphragm, and will automatically actuate the latter as soon as the inertia at the forward end of the spring has been overcome by the accumulated tension produced by the muscular efforts of the operator; and that the natural frequency of the diaphragm and the tension of the spring react upon each other to produce the regular and rhythmic diaphragm-vibrations that are manifested by the fact that the resultant signal-note is of practically uniform pitch and intensity.

It will be understood by those skilled in the art that the crank 28, or its equivalent, may be attached directly to shaft 17 without the intervening flexible shaft 22; and that many other changes and modifications may be resorted to without departing from the scope of my invention.

What I claim is:

1. A signal-device, comprising a diaphragm and means for vibrating the same, a reciprocatory member actuated by the operator, a flexible-shafting reciprocally rotated by said member, and a power-transmitting spring interposed between said shaft and said vibrating-means.

2. A signal-device, comprising the combination of an acoustic diaphragm, mechanism actuated by the operator, a spring adapted to be put under tension by said mechanism, a cam adapted to be rotated by said spring as soon as the tension of the latter exceeds the resistance of said diaphragm, said diaphragm being actuated as aforesaid by the operator through said spring and cam and acting as the sole escapement for the spring.

3. A signal-device, comprising reciprocating mechanism actuated by the operator, means for translating the movement thereof into intermittent rotary motion in one direction only, a spring adapted to be wound by said rotary motion, a cam driven by said spring, and an acoustic diaphragm vibrated by said cam and acting as the sole escapement therefor.

4. A signal-device comprising the combination of a reciprocatory crank-handle, a flexible shaft reciprocally rotated thereby, an acoustic diaphragm, and means applying the power of said crank and said flexible shaft to mechanically vibrate said diaphragm.

5. In a signaling-apparatus, the combination of an acoustic diaphragm, a shaft, a diaphragm-actuating member loosely mounted thereon, and a coiled spring encircling said shaft and having one end secured thereto and the other end secured to said actuating member.

6. In a signaling-device, the combination of an acoustic diaphragm, a rotor having projections adapted to vibrate said diaphragm, a spring adapted to rotate said rotor, and means for putting said spring under tension, said means including a rotatable member, a manually-actuated reciprocating member, and ratchet-and-pawl connections between said members.

7. A signal-device, comprising the combination of a vibratory acoustic diaphragm, mechanism directly actuated by the operator for vibrating the same, and suitable transmission-means between said mechanism and the diaphragm, said diaphragm's inertia against vibration being less than said transmission's inertia against being actuated.

8. In a signal-device, the combination of an acoustic diaphragm and means actuated by the operator for agitating the same, the inertia at starting said actuating-means being greater than the diaphragm-inertia the latter has to overcome in starting the diaphragm.

9. In a signaling-device, the combination of a manually-actuated member, a gear-wheel reciprocally rotated by said member and carrying a pawl, a ratchet-wheel rotated by said pawl, a spring having one end secured to rotate with said ratchet-wheel, a toothed wheel having the other end of said spring secured thereto, and an acoustic diaphragm vibrated by said toothed wheel.

10. In a signaling-device, the combination of a manually-actuated member, a gear-wheel reciprocally rotated by said member, a member driven by said gear-wheel through a pawl-and-ratchet connection, a spring having one end secured to said member, a toothed wheel having the other end of said spring in driving connection therewith, and an acoustic diaphragm vibrated by said toothed wheel.

11. In a signaling-apparatus, the combination of an acoustic diaphragm, a driving member, a diaphragm-actuating member loosely mounted thereon, and a coiled spring encircling said driving member and having one end connected thereto and the other end connected to said actuating member.

EMANUEL AUFIERO.

Witnesses:
C. A. L. Massie,
Ralph L. Scott.